US012747628B2

(12) United States Patent
Gries et al.

(10) Patent No.: US 12,747,628 B2
(45) Date of Patent: Sep. 29, 2026

(54) FORCE INDICATOR FOR A GATE

(71) Applicant: Dorel Juvenile Group, Inc., Foxboro, MA (US)

(72) Inventors: Thomas Gries, Seekonk, MA (US); Brandon M. Drumm, Holbrook, MA (US)

(73) Assignee: Dorel Juvenile Group, Inc., Foxboro, MA (US)

(*) Notice: Subject to any disclaimer, the term of this patent is extended or adjusted under 35 U.S.C. 154(b) by 0 days.

(21) Appl. No.: 18/891,320

(22) Filed: Sep. 20, 2024

(65) Prior Publication Data

US 2025/0101798 A1 Mar. 27, 2025

Related U.S. Application Data

(60) Provisional application No. 63/539,864, filed on Sep. 22, 2023.

(51) Int. Cl.
*E06B 9/04* (2006.01)
*E05B 41/00* (2006.01)
*E05B 65/00* (2006.01)
*E06B 9/00* (2006.01)

(52) U.S. Cl.
CPC ................ *E06B 9/04* (2013.01); *E05B 41/00* (2013.01); *E05B 65/0007* (2013.01); *E06B 2009/002* (2013.01)

(58) Field of Classification Search
None
See application file for complete search history.

(56) References Cited

U.S. PATENT DOCUMENTS

| | | | | |
|---|---|---|---|---|
| 6,301,832 | B1 * | 10/2001 | Andersen | A01K 1/0017 49/57 |
| 6,370,823 | B1 | 4/2002 | Andersen | |
| 6,446,395 | B2 | 9/2002 | Rogers | |
| 7,422,048 | B2 | 9/2008 | Andersen | |
| 8,627,602 | B2 | 1/2014 | Yates | |
| 9,995,063 | B2 | 6/2018 | Andersen | |
| 10,024,080 | B2 | 7/2018 | Marsden | |
| 10,221,618 | B2 | 3/2019 | Pedersen | |
| 10,370,897 | B2 | 8/2019 | Birkert | |
| 10,393,978 | B2 | 8/2019 | Coenegracht | |
| 10,914,099 | B2 * | 2/2021 | Gentil | E05F 1/063 |
| 11,072,973 | B2 * | 7/2021 | Flannery | E06B 11/022 |
| 11,377,886 | B1 * | 7/2022 | Flannery | E05B 9/02 |
| 2008/0028681 | A1 | 2/2008 | Andersen | |
| 2017/0058594 | A1 | 3/2017 | Marsden | |
| 2022/0195790 | A1 | 6/2022 | Losik | |

* cited by examiner

*Primary Examiner* — Marcus Menezes
(74) *Attorney, Agent, or Firm* — Barnes & Thornburg LLP

(57) ABSTRACT

A gate unit a gate mount adapted to mate with a frame bordering a passageway and a gate mounted on the gate mount for movement between an opened position opening a passage formed in the gate mount and a closed position closing the passage formed in the gate mount. The gate unit further includes force indicator used during installation of the gate mount.

16 Claims, 8 Drawing Sheets

FORCE INDICATOR FOR A GATE

PRIORITY CLAIM

This application claims priority under 35 U.S.C. § 119(e) to U.S. Provisional Patent Application No. 63/539,864, filed Sep. 22, 2023, which is expressly incorporated by reference herein in its entirety.

BACKGROUND

The present disclosure relates to child safety devices, and particularly to a child safety gate. More particularly, the present disclosure relates to a pressure-installed child safety gate.

SUMMARY

According to the present disclosure, a gate unit includes a gate mount adapted to mate with a frame bordering a passageway and a gate mounted on the gate mount. The gate is configured to pivot about a gate-pivot axis between an opened position opening a passage formed in the gate mount and a closed position closing the passage formed in the gate mount.

In illustrative embodiments, a lower force indicator configured to indicate to a user when installation of the gate mount is complete. The lower force indicator includes a lower indicator panel, a lower bumper, and a lower bumper insert configured to receive the lower bumper and engage the lower indicator panel. The lower indicator panel is configured to display a first visual representation when a force less than a first predetermined force is applied through the lower bumper to the frame bordering the passageway and a second visual representation when the force applied through the lower bumper to the frame bordering the passageway is at least the first predetermined force.

In illustrative embodiments, the gate unit further includes an upper force indicator configured to indicate to the user that the gate mount is installed in the frame bordering the passageway. The upper force indicator includes an upper indicator panel, an upper bumper, and an upper bumper insert configured to receive the upper bumper. The upper indicator panel configured to display a third visual representation when a force applied through the upper bumper to the frame bordering the passageway is less than a second predetermined force and a fourth visual representation when the force applied through the upper bumper to the frame bordering the passageway is at least the second predetermined force. In some embodiments, the first and second predetermined forces are the about the same.

In illustrative embodiments, the gate mount is formed to include a latch receiver and the gate unit further includes a latch system coupled to the gate to engage selectively with the latch receiver. The latch system includes an actuator handle configured to pivot about a handle-pivot axis, a handle lock coupled to the actuator handle and configured to slide relative to the actuator handle, and a latch coupled to the handle actuator for movement relative to the gate. The latch is configured to move between a locked configuration and an unlocked configuration in response to movement of the actuator handle. In the locked configuration, the latch extends into the latch receiver formed in the gate mount to lock the gate in the closed position so that the gate is blocked from movement about the gate-pivot axis. In the unlocked configuration, the latch is removed from the latch receiver formed in the gate mount to unlock the gate so that the gate is free for movement about the gate-pivot axis to the opened position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a front view of a gate unit, in accordance with the present disclosure, including a gate mount a gate mount adapted to mate with a frame bordering a passageway and formed to include a latch receiver, a gate mounted on the gate mount for pivotable movement about a gate-pivot axis between an opened position opening a passage formed in the gate mount and a closed position closing the passage formed in the gate mount, and an installation-indicator unit having a lower force indicator and an upper force indicator configured to indicate that the gate mount is installed in the frame bordering the passageway, FIG. 2 is an enlarged view of a portion of the gate unit of FIG. 1 showing portions of the lower force indicator in an uninstalled configuration in which a force applied to the frame bordering the passageway is less than a predetermined force to cause the lower force indicator to display a first visual representation to a user and indicate that further installation is needed;

FIG. 3 is an enlarged view of a portion of the gate unit of FIG. 1 showing portions of the lower force indicator in an installed configuration in which a force applied to the frame bordering the passageway is at or greater than the predetermined force to cause the lower force indicator to display a second visual representation to a user and indicate that installation of the lower force indicator is complete;

FIG. 4 is an exploded assembly view of the gate unit showing that the lower force indicator includes a lower indicator panel, a lower bumper, and a lower bumper insert configured to receive the lower bumper and engage the lower indicator panel, and showing that the upper force indicator includes an upper indicator panel coupled to a latch unit included in the gate unit, an upper bumper, and an upper bumper insert configured to receive the upper bumper;

FIG. 5 is a front view of a portion of the gate unit with portions of the gate mount omitted to show that the indicator panel of the lower force indicator includes a first indication zone having the first visual representation, a second indication zone having the second visual representation, and, optionally, a third indication zone having the first visual representation or another visual representation;

Figure 12:
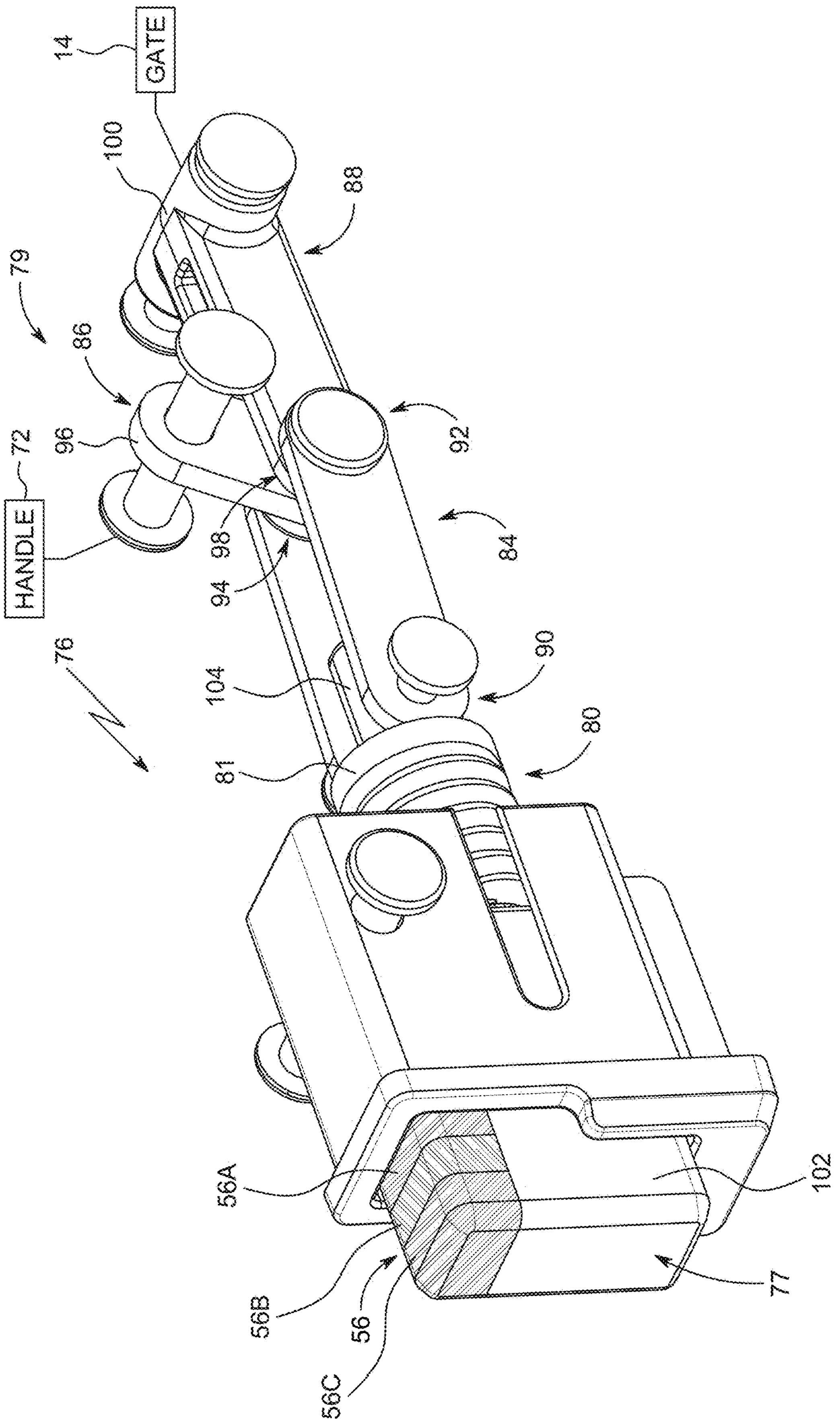

FIG. 12 is a perspective view of the latch pin and the latch-pin mover showing that the indicator panel of the upper force indicator is integrated into the latch pin and has a first indication zone having the first visual representation, a second indication zone having the second visual representation, and, optionally, a third indication zone having the first visual representation or another visual representation.

DETAILED DESCRIPTION

Figure 1:
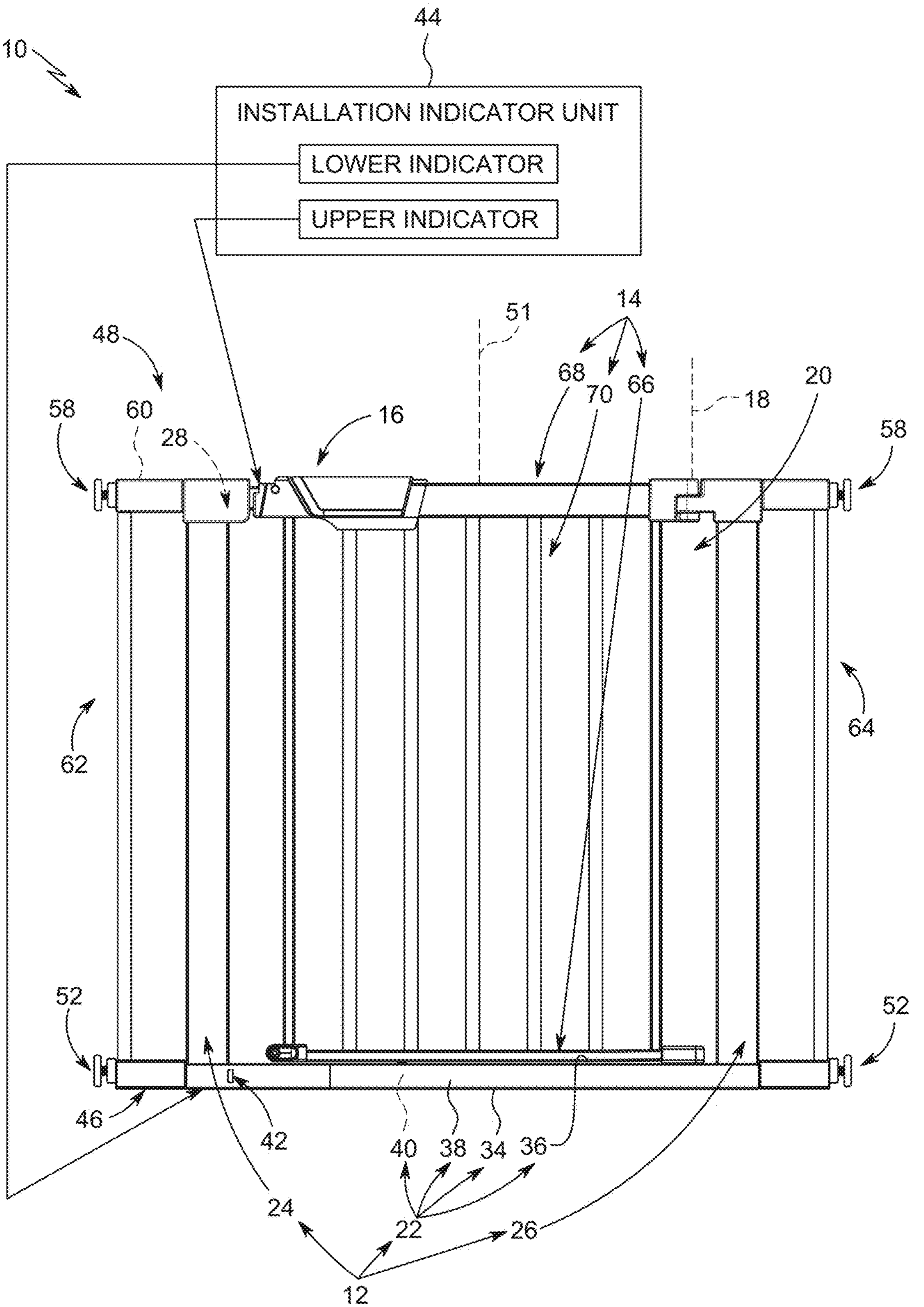
Figure 2:
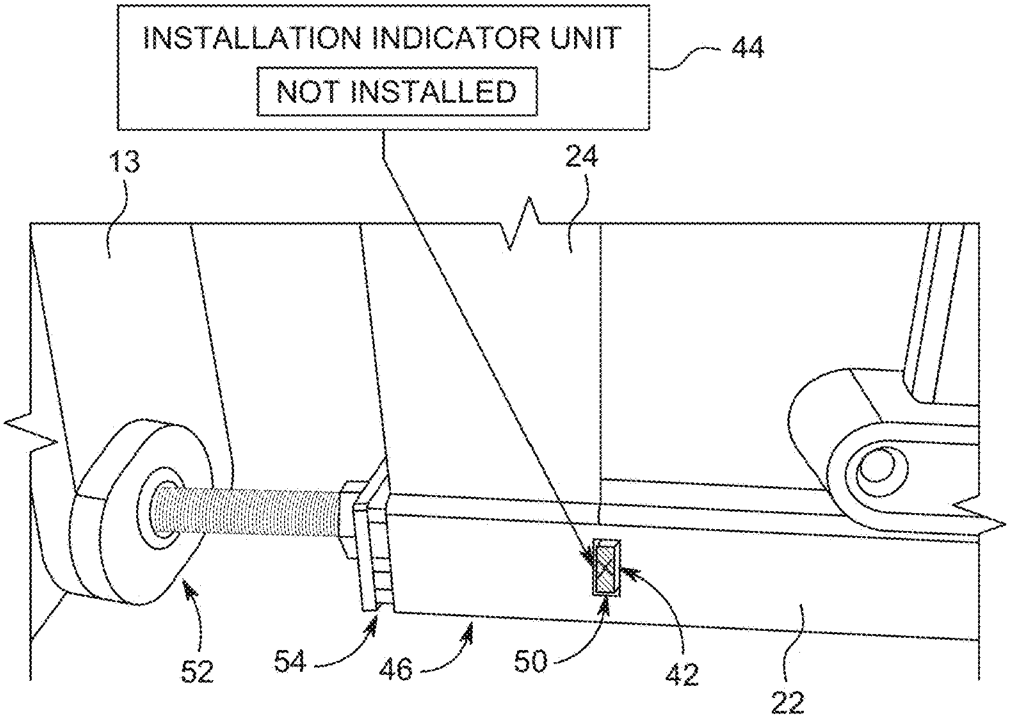
Figure 3:
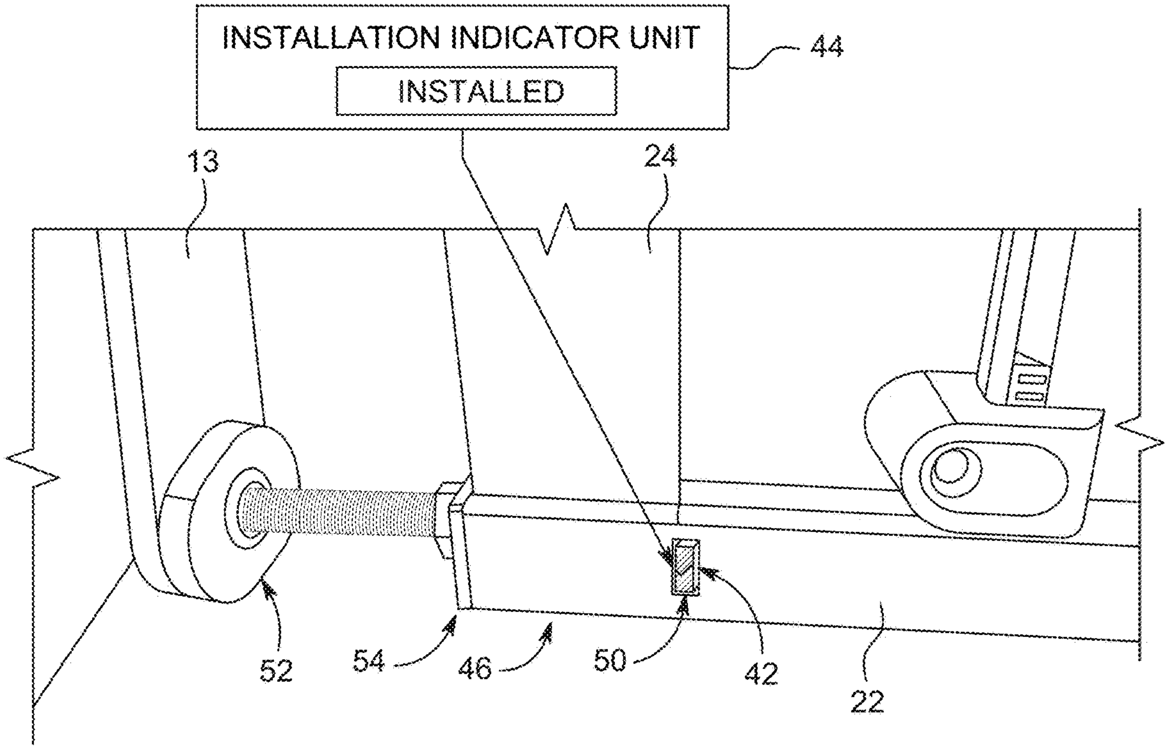

A gate unit 10 includes a gate mount 12, a gate 14 mounted on the gate mount 12, and a latch system 16 coupled to the gate 14 as shown in FIG. 1. The gate mount 12 is adapted to mate with a frame 13 bordering a passageway. In the illustrative embodiment, the frame is provided by two substantially parallel surfaces of a door frame and the passageway is the space between the two substantially parallel surfaces. The gate 14 pivots about a gate-pivot axis 18 between an opened position opening a passage 20 formed in the gate mount 12 and a closed position closing the passage 20 formed in the gate mount 12. The latch system 16 is configured to lock the gate 14 in the closed position and unlock the gate 14 so that the gate 14 can be pivoted about the gate-pivot axis 18 to the opened position.

The gate mount 12 includes a horizontal frame 22, a first vertical frame 24, and a second vertical frame 26 in spaced apart relation to the first vertical frame 24 as shown in FIG. 1. The horizontal frame 22 is substantially flush with an underlying floor. The first vertical frame 24 and the second vertical frame 26 extend upwardly from opposing ends of the horizontal frame 22. The first vertical frame 24 is formed to include a latch receiver or catch 28 and an upper bumper insert-receiving passageway 30 at an upper end of the first vertical frame 24.

The horizontal frame 22 extends between and interconnects the first vertical frame 24 and the second vertical frame 26 as shown in FIG. 1. The horizontal frame 22 has a first wall 34 substantially flush with the underlying floor, a second wall 36 in spaced apart parallel-relation to the first wall 34, a third wall 38 extending between and interconnecting the first wall 34 and the second wall 36, and a fourth wall 40 in spaced apart parallel-relation to the third wall 38. In other embodiments, the horizontal frame 22 can have more or less walls to provide the horizontal frame 22 with a different cross sectional shape.

Figure 5:
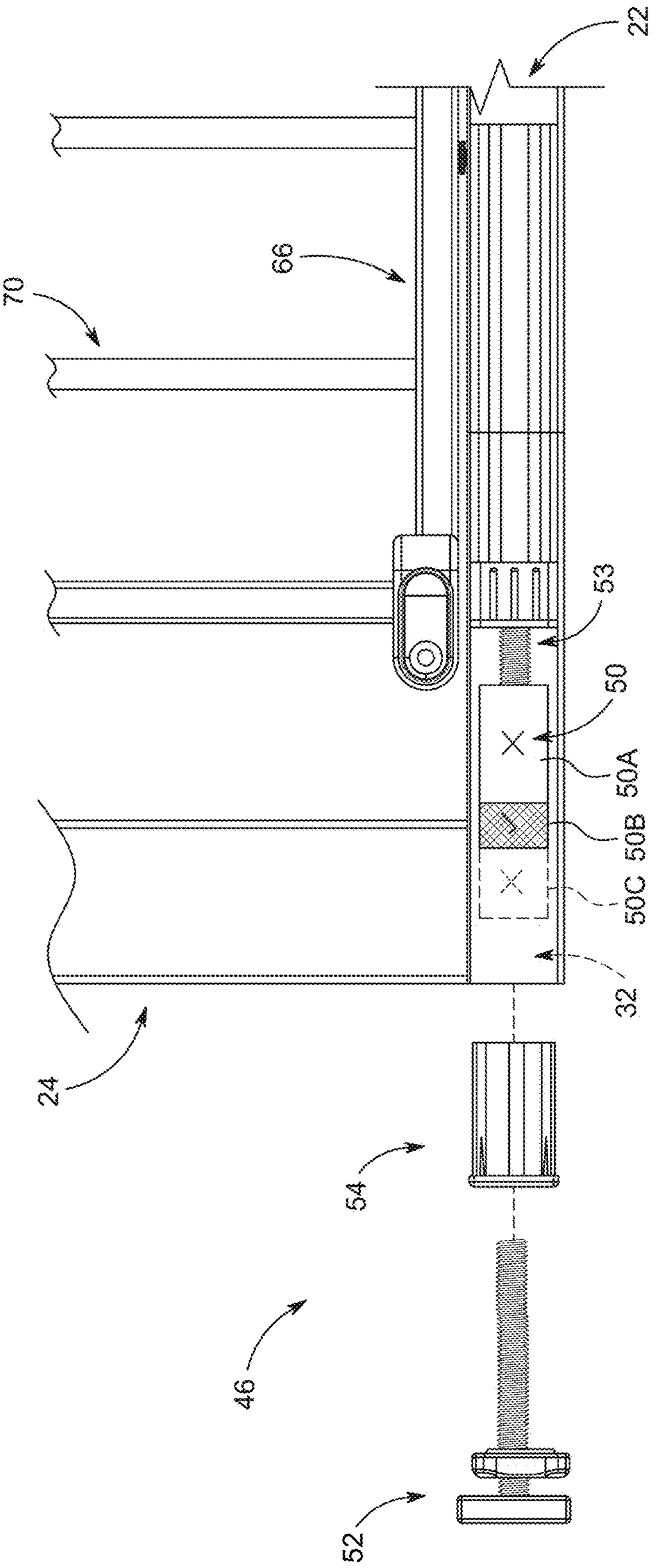

The first wall 34, the second wall 36, the third wall 38, and the fourth wall 40 of the horizontal frame 22 cooperate to form a lower bumper insert-receiving passageway 32 therebetween as shown in FIG. 5. At least one of the third wall 38 and the fourth wall 40 are formed to include a slot 42 extending through the at least one of the third wall 38 and the fourth wall 40. The slot 42 opens into the lower bumper insert-receiving passageway 32 such that a user can visually see into the lower bumper insert-receiving passageway 32.

The gate mount 12 further includes an installation-indicator unit 44 having a lower force indicator 46 and an upper force indicator 48 as shown in FIG. 1. The lower force indicator 46 and the upper force indicator 48 are configured to maintain a stable location of the gate mount 12 within the frame. The lower force indicator 46 and the upper force indicator 48 both cooperate with the frame to securely hold the gate unit 10 within the frame. The installation-indicator unit 44 may further include additional upper and lower installation assemblies coupled to the second vertical frame 26 of the gate mount 12 to further indicate proper installation of the gate 10 within the frame bordering the passageway. In the illustrative embodiment, the upper and lower force indicators 46, 48 may be coupled to an extension 62 also included in the gate mount 12. In some embodiments, the upper and lower force indicators 46, 48 may be coupled directly to at least one of the vertical frames 24, 26 such that the extension(s) 62 is omitted.

The lower force indicator 46 includes a lower indicator panel 50, a lower bumper 52, and a lower bumper insert 54 configured to receive the lower bumper 52 and engage the lower indicator panel 50 as shown in FIG. 5. The lower indicator panel 50 is located within the lower bumper insert-receiving passageway 32 and visible through the slot 42 to the user. The lower bumper 52 directly contacts the frame to locate the gate unit 10 within the frame. The lower bumper insert 54 is received within the lower bumper insert-receiving passageway 32 formed in the horizontal frame 22 of the gate mount 12.

The lower indicator panel 50 displays a first visual representation when a pressure or force less than a first predetermined pressure or force is applied through the lower bumper 52 to the frame bordering the passageway as suggested in FIG. 5. The first visual representation indicates that the gate mount 12 is not properly installed. The lower indicator panel 50 displays a second visual representation when a pressure that is at least the first predetermined pressure is applied through the lower bumper 52 to the frame bordering the passageway to indicate that the gate mount 12 is properly installed. Thus, the lower indicator panel 50 informs the user as to whether the gate mount 12 is properly installed within the frame.

The lower indicator panel 50 is configured to translate within the lower bumper insert-receiving passageway 32 between a first position in which the first visual representation is displayed through the slot 42 and a second position in which the second visual representation is displayed through the slot 42 as suggested in FIG. 5. The lower indicator panel 50 is normally biased outwardly away from a centerline 51 of the gate 14 by a bias member 53 to the first position such that the first visual representation is displayed through the slot 42. In the first position, a pressure less than the first predetermined pressure is applied through the lower bumper 52 to the frame bordering the passageway such that the lower bumper insert 54 does not push the lower indicator panel 50 inwardly toward the centerline 51. The first visual representation suggests that at least a portion of the gate mount 12 is not properly installed within the frame. For example, the first visual representation is displayed when the lower force indicator 46 of the gate mount 12 is not tightly installed within the frame to indicate that the gate mount 12 may be unstable.

The lower bumper 52 includes a screw and a tightening nut that is configured to be tightened between the frame bordering the passageway and the horizontal frame 22 of the gate mount 12 to extend the lower bumper 52 as suggested in FIG. 5. As the tightening nut of the lower bumper 52 is tightened, the lower bumper 52 and/or the lower bumper insert 54 push the lower indicator panel 50 inwardly toward the centerline 51 and toward the second position. The inward movement of the lower indicator panel 50 compresses the bias member 53, which applies pressure or force through the lower bumper 52 to the frame bordering the passageway. Thus, a pressure or force that is at least the first predetermined pressure is applied through the lower bumper 52 to the frame bordering the passageway. In the second position, the lower indicator panel 50 displays the second visual representation through the slot 42. The second visual representation suggests that the gate mount 12 is properly installed within the frame. For example, at least a portion of the gate mount 12 is tightly installed within the frame to indicate that the gate mount 12 is installed. In some embodiments, the first predetermined force is provided only by the bias member 53 and the bias member 53 suspends the gate mount 12 between the lower bumper 52 and a second lower bumper 52 positioned on an opposite side of the gate mount 12.

Figure 6:
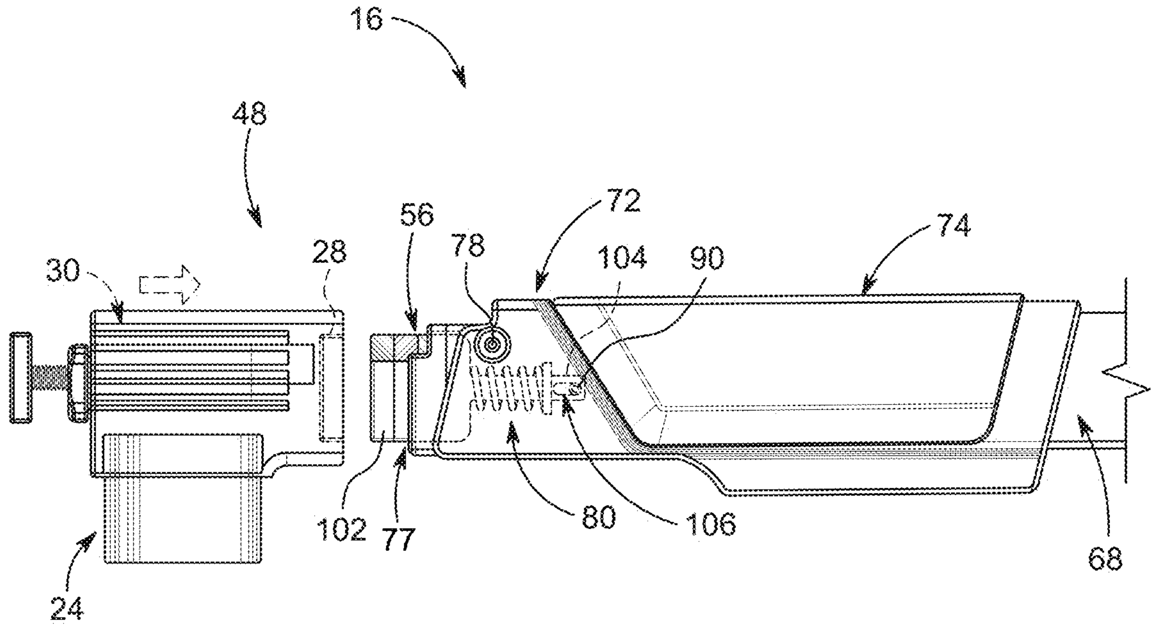
FIG. 6 is a front view of a portion of the gate unit showing the upper force indicator and the latch unit in an uninstalled configuration in which a latch pin included in the latch unit is separated from a latch receiver prior due to a force applied to the upper force indicator being below a predetermined force.

The upper force indicator 48 of the installation-indicator unit 44 includes an upper indicator panel 56, an upper bumper 58, and an upper bumper insert 60 configured to receive the upper bumper 58 as shown in FIGS. 1 and 6. The upper indicator panel 56 is configured to display a third visual representation when a pressure or force less than a second predetermined pressure or force is applied through the upper bumper 58 to the frame bordering the passageway to indicate that the gate mount 12 is not properly installed. The upper indicator panel 56 is configured to display a fourth visual representation when a pressure or force that is at least the second predetermined pressure or force is applied through the upper bumper 58 to the frame bordering the passageway to indicate that the gate mount 12 is properly installed. The upper bumper 58 directly contacts the frame bordering the passageway but may not directly contact the upper indicator panel 56 or the upper bumper insert 60.

In one embodiment, the first visual representation of the lower indicator panel 50 and the third visual representation of the upper indicator panel 56 includes a first color. In one example, the first color is red. The second visual representation of the lower indicator panel 50 and the fourth visual representation of the upper indicator panel 56 includes a second color different from the first color. In one example, the second color is green. The visual representations may further include other visual indications, such as icons or text, to further indicate the installation state of the gate mount 12. In another embodiment, the first visual representation of the lower indicator panel 50 includes a first pattern and the third visual representation of the upper indicator panel 56 includes the first pattern. The second visual representation of the lower indicator panel 50 includes a second pattern and the fourth visual representation of the upper indicator panel 56 includes the second pattern. The second pattern is different from the first pattern.

In another embodiment, the first visual representation of the lower indicator panel 50 includes a first symbol and the third visual representation of the upper indicator panel 56 includes the first symbol. For example, the first symbol includes an 'X'. The second visual representation of the lower indicator panel 50 includes a second symbol and the fourth visual representation of the upper indicator panel 56 includes the second symbol. The second symbol is different from the first symbol. For example, the second symbol includes a checkmark.

The indicator panel 50 of the lower force indicator 46 may have a first indication zone 50A, a second indication zone 50B, and/or a third indication zone 50C as shown in FIG. 5. The first indication zone 50A has the first visual representation and is displayed through the slot 42 when the force applied is less than the first predetermined force to indicate more force is needed. The second indication zone 50B has the second visual representation and is displayed through the slot 42 when the force applied is at or greater than the first predetermined force to indicate installation of the lower bumper 52 is complete. The third indication zone 50C has the first visual indication, or a third visual representation different than the first and second visual representations, and is displayed through the slot 42 when the force applied is greater than a second predetermined force higher than the first predetermined force. This can be used to indicate when the lower bumper 52 has been overtightened and at risk of damaging the gate unit 10.

In some embodiments, the gate mount 12 includes a first extension 62 and a second extension 64 as shown in FIG. 1. The first extension 62 and the second extension 64 are coupled to the first vertical frame 24 and the second vertical frame 26, respectively, to allow the gate mount 12 to be installed within a larger frame. The installation-indicator units 46, 48 may be coupled directly to one or both of the extensions 62, 64 and/or the vertical frames 24, 26.

The gate 14 of the gate unit 10 includes a first horizontal member 66, a second horizontal member 68, and a plurality of vertical members 70 extending therebetween as shown in FIG. 1. The first horizontal member 66 is substantially flush with the horizontal frame 22 of the gate mount 12. The second horizontal member 68 is located above the first horizontal member 66. The second horizontal member 68 is coupled with the first vertical frame 24 of the gate mount 12 via the latch system 16 and coupled with the second vertical frame 26 of the gate mount 12 via a hinge. The plurality of vertical members 70 extend between the first horizontal member 66 and the second horizontal member 68 to block the passage 20 formed in the gate mount 12.

The latch system 16 includes an actuator handle 72, a handle lock 74, and a latch 76 as shown in FIGS. 6-11. The actuator handle 72 is coupled with the second horizontal member 68 of the gate 14 and is configured to be maneuvered by a user to unlock the gate 14. The handle lock 74 is coupled with the actuator handle 72 to block movement of the handle lock 74. The actuator handle 72 and the handle lock 74 provide two-stage unlocking of the latch 76 to added child security. The latch 76 is coupled to the actuator handle 72 for movement relative to the gate 14 in response to movement of the actuator handle 72 following disengagement of the handle lock 74. The catch 28 may be included in the latch system 16 in some embodiments.

Figure 7:
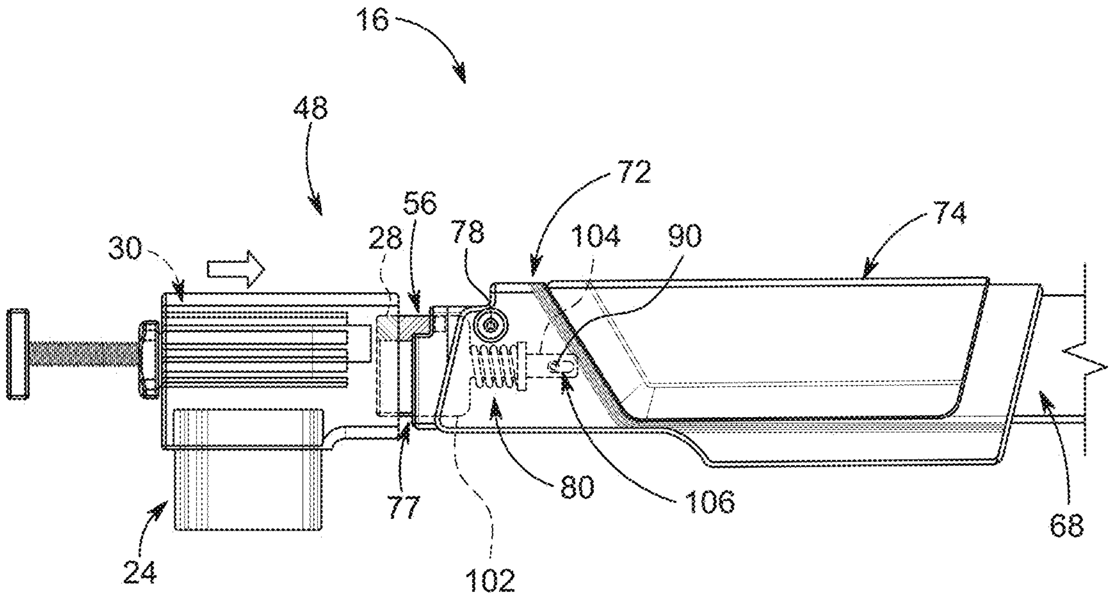
FIG. 7 is a front view of a portion of the gate unit showing the upper force indicator and the latch unit in an installed configuration in which the latch pin engages the latch receiver to block pivotable movement of the gate relative to the gate mount after the force applied to the upper force indicator has reached the predetermined force.
Figure 8:
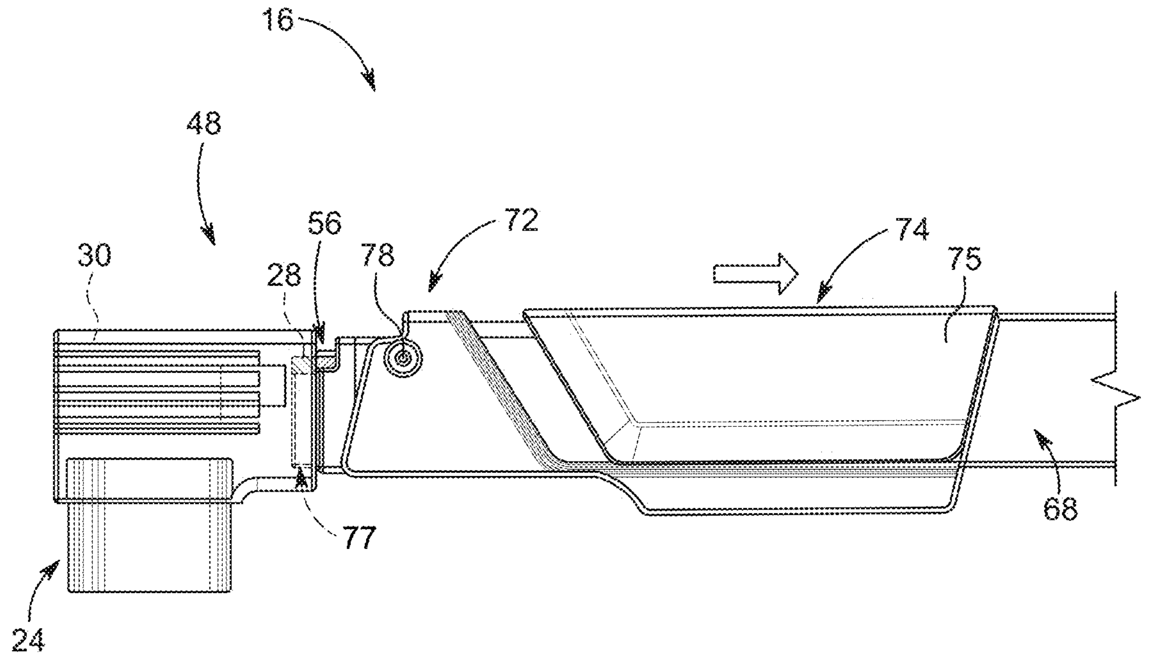
FIG. 8 is a front view of a portion of the gate unit showing a handle cover included in the latch unit slid relative to an actuator handle also included in the latch unit to unlock the actuator handle for pivotal movement about a handle pivot axis from a locked configuration to an unlocked configuration, as shown in FIG. 9.
Figure 9:
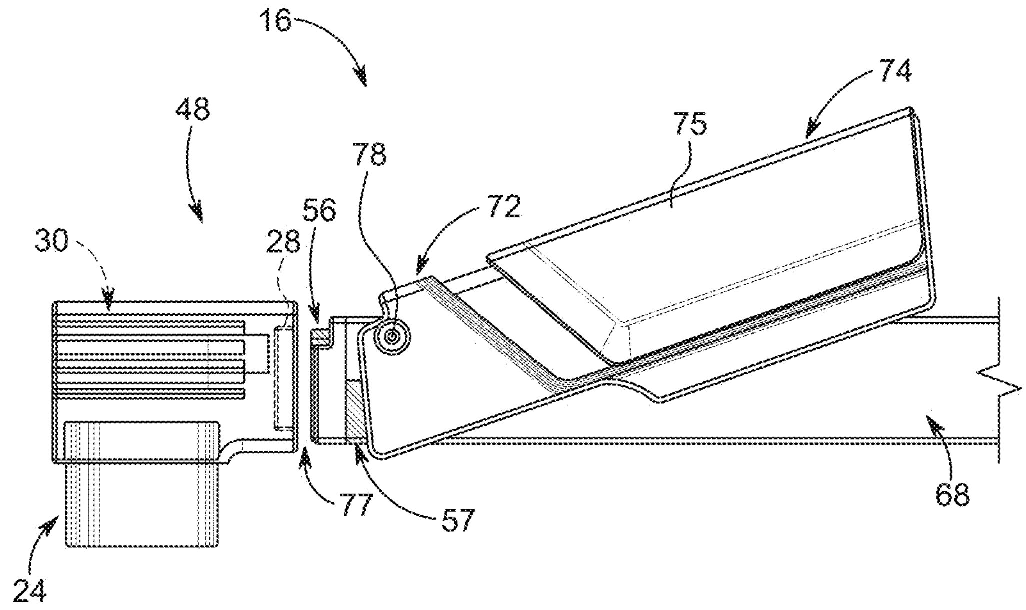
FIG. 9 is a front view of a portion of the gate unit showing the actuator handle in the unlocked configuration in which the latch pin is withdrawn from the latch receiver to free the gate for movement about the gate pivot axis.
Figure 11:
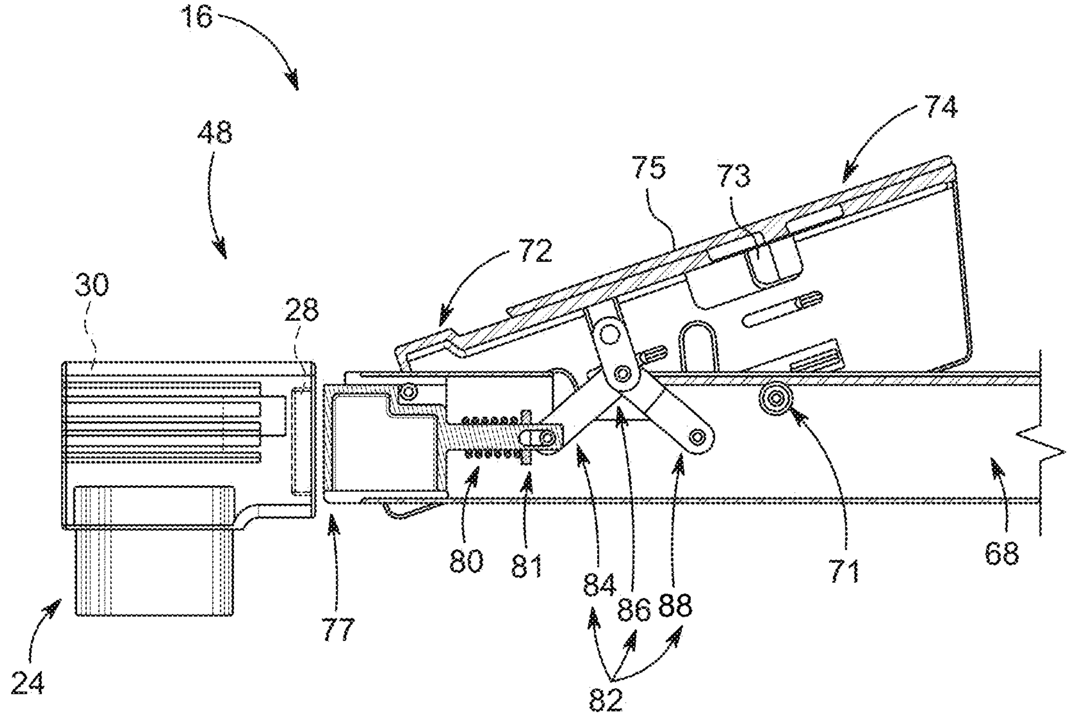
FIG. 11 is a cross section of the latch unit in the unlocked configuration showing the latch pin withdrawn from the latch receiver.

The actuator handle 72 is configured to move or pivot about a handle-pivot axis 78 as shown in FIGS. 9 and 11. The handle lock 74 includes a handle cover 75 configured to slide relative to the actuator handle 72 to free the actuator handle 72 for movement about the handle-pivot axis 78 as shown in FIG. 8. The handle cover 75 includes at least one actuator cam 73 configured to engage one or more lock pins 71 coupled to the gate 14 to separate the lock pin(s) 71 from the actuator handle 74 and free the actuator handle 72 for movement about the handle pivot axis 78. The latch 76 is configured to move between a locked configuration in which the latch 76 engages or extends into the latch receiver or catch 28 formed in the first vertical frame 24 of the gate mount 12 to lock the gate 14 in the closed position so that the gate 14 is blocked from movement about the gate-pivot axis 18, as shown in FIG. 7, and an unlocked configuration in which the latch 76 disengages or is removed from of the latch receiver 28 formed in the first vertical frame 24 of the gate mount 12 to unlock the gate 14 so that the gate 14 is free to move to the opened position about the gate-pivot axis 18, as shown in FIG. 9.

Figure 10:
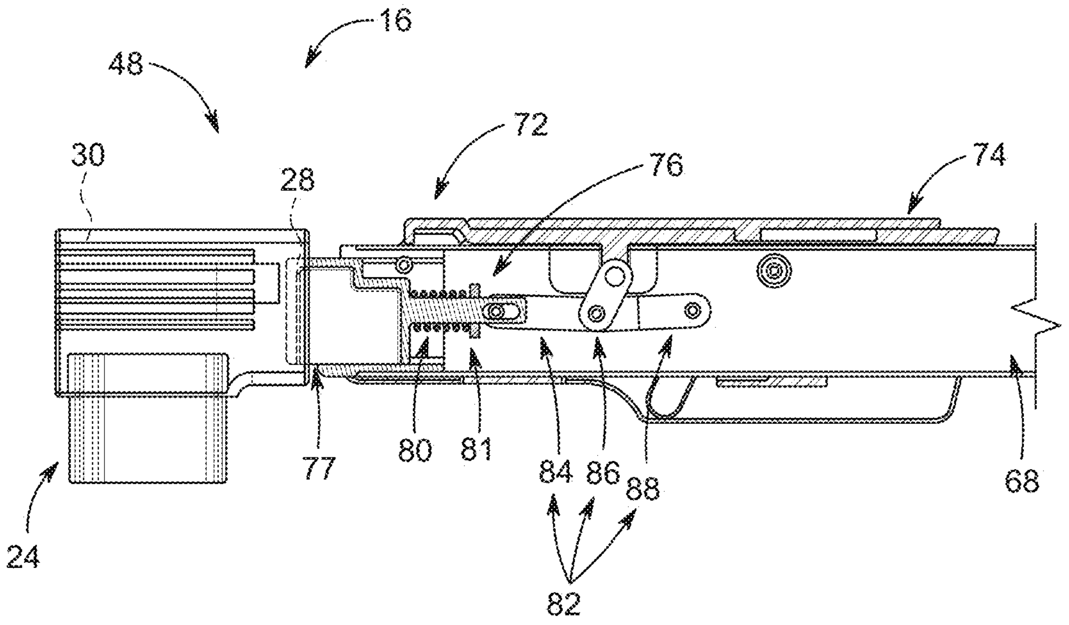
FIG. 10 is a cross section of the latch unit in the locked configuration showing that the latch unit further includes a latch-pin mover having a plurality of linkages configured to move the latch pin away from the latch receiver and a bias member configured to urge the latch pin toward the latch receiver.

The latch 76 includes a latch pin 77 and a latch-pin mover 79 as shown in FIGS. 10-12. The latch pin 77 is configured to engage with the latch receiver 28 to block movement of the gate 14 about the gate pivot axis 18. The latch-pin mover 79 is coupled with the latch pin 77, the actuator handle 72, and the gate 14. The latch-pin mover 79 is configured to move the latch pin 77 away from the latch receiver 28 upon actuation of the latch handle about the handle pivot axis 78 to unlock the gate 14 for movement about the gate pivot axis 18.

The latch-pin mover 79 includes a bias member 80, a washer 81, and a plurality of linkages 82 as shown in FIGS. 10-12. The bias member 80 is coupled between the latch pin 77 and the plurality of linkages 82 and is configured to urge the latch pin 77 toward the latch receiver 28. The washer 81 is coupled between the bias member 80 and the plurality of linkages 82. The plurality of linkages 82 are configured to move the latch pin 77 relative to the gate 14 between the locked configuration and the unlocked configuration.

The plurality of linkages 82 includes a first linkage 84 coupled to the latch 76, a second linkage 86 coupled to the actuator handle 72, and a third linkage 88 coupled to the first horizontal member 66 of the gate 14 as shown in FIGS. 10-12. The first linkage 84 has a first end 90 coupled to the latch pin 77 and a second end 92 coupled with the second linkage 86 and the third linkage 88. The second linkage 86 has a first end 94 coupled to the second end 92 of first linkage 84 and a second end 96 coupled to the actuator handle 72. The third linkage 88 has a first end 98 coupled to the first end 94 of the second linkage 96 and second end 100 coupled to the gate 14. Each end of the linkages 82 is mounted for pivotable movement relative to one another and relative to the gate 14.

The second linkage 86 is configured to move with the actuator handle 72 about the handle pivot axis 78 to decrease a distance between the first end 90 of the first linkage 84 and the second end 100 of the third linkage 88. In response to this movement, the first linkage 84 is configured to withdraw the latch pin 77 from the latch receiver 28 formed in the gate mount 12 in the unlocked configuration.

The latch pin includes a pin base 102 configured to engage with the latch receiver 28 and a guide post 104 coupled to the pin base 102 and to the first end 90 of the first linkage 84. The pin-bias member 80 includes a spring wrapped around the guide post 104 and configured to apply a force between the first end 90 of the first linkage 84 and the pin base 102 to urge the latch pin 77 toward the latch receiver 28.

The guide post 104 is formed to include a slot 106 that receives a portion of the first end 90 of the first linkage 84 as shown in FIGS. 10 and 11. The latch pin 77 is configured to translate relative to the gate 14 and the plurality of linkages 82 between an extended position and a retracted position to indicate when installation of the gate unit in the frame 13 is complete. In the extended position, the latch base 102 is separated from the latch receiver 28 and is spaced a first distance from the first end 90 of the first linkage 84 prior to installation of the gate unit 10 in the frame 13. In the retracted position, the latch base 102 engages the latch receiver 28 and is spaced a second distance from the first end 90 of the first linkage 84, less than the first distance, after installation of the gate unit 10 in the frame 13. The spring of the pin-bias member 80 has a first length when the latch pin 77 is in the extended position and a second length, less than the first length, when the latch pin 77 is in the retracted position.

Figure 4:
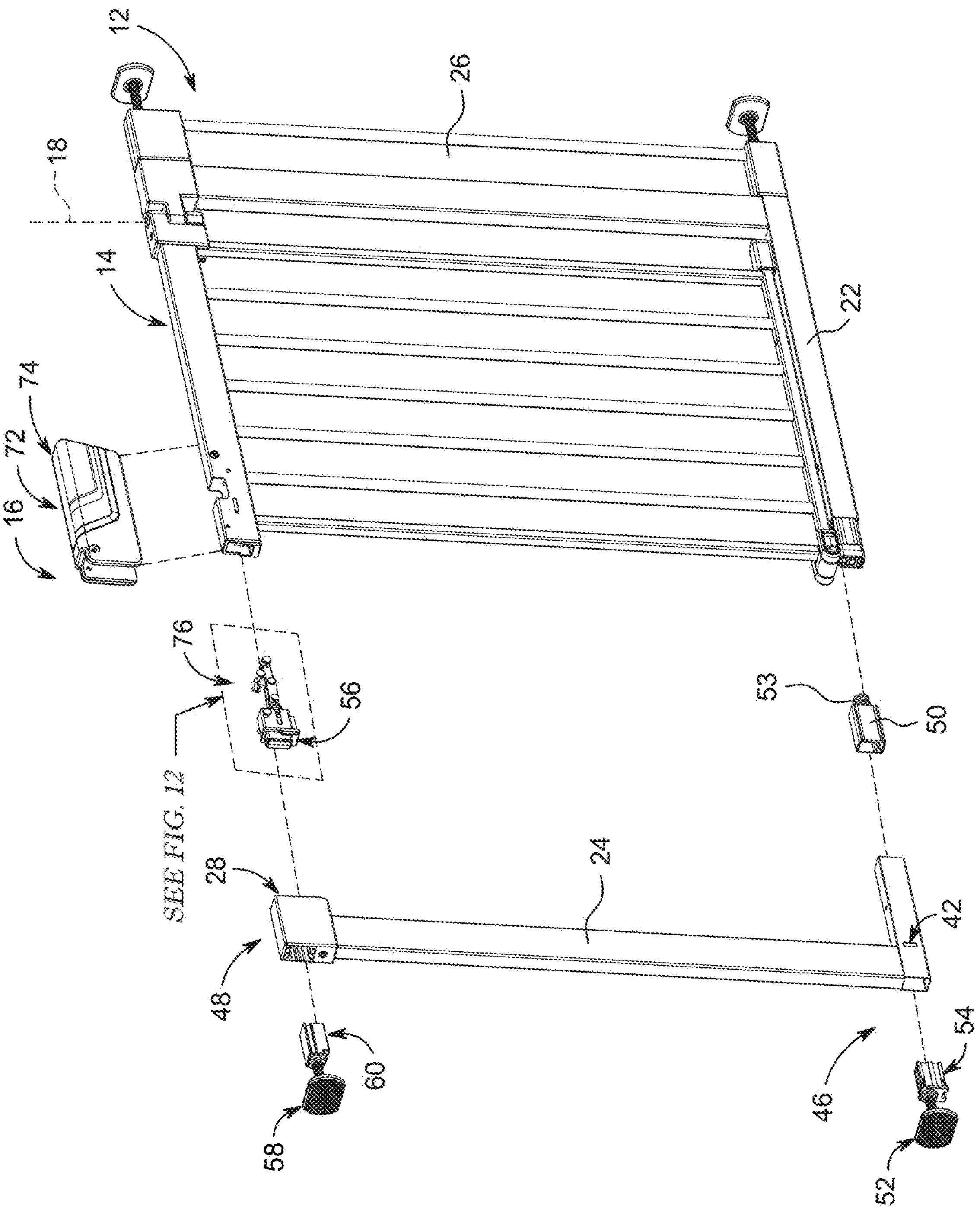

To unlock and open the gate 14, the actuator handle 72 is pivoted in a first (i.e. counterclockwise) direction about the handle-pivot axis 78 and the handle lock 74 is moved away from the latch receiver 28 and toward the centerline 51 as shown in FIGS. 1 and 4. The second linkage 86 translates the pivoting movement of the actuator handle 72 about the handle-pivot axis 78 to the first linkage 84, and the first linkage 84 pulls the latch 76 inwardly and out of the latch receiver 28 formed in the gate mount 12 so that the latch 76 is in the unlocked configuration.

To lock and close the gate 14, the handle lock 74 is moved toward the latch receiver 28 and away from the centerline 51, and the actuator handle 72 is pivoted in a second (i.e. clockwise) direction toward the second horizontal member 68 of the gate 14 as shown in FIGS. 6-9. The second linkage 86 translates the pivoting movement of the actuator handle 72 about the handle-pivot axis 78 to the first linkage 84. The first linkage 84 extends the latch 76 into the latch receiver 28 formed in the gate mount 12 so that the latch 76 is in the locked configuration. The movement of the first linkage 84 compresses the bias member 80 between the latch 76 and the washer 81 so that pressure is applied through the second horizontal member 68 of the gate 14 to the first vertical frame 24 of the gate mount 12, and thus, the upper bumper 58 and the frame bordering the passageway. The actuator handle 72 may be biased in the second direction and the handle lock 74 may be biased to a locked position blocking movement of the actuator handle in the first direction.

In one embodiment, the upper indicator panel 56 of the upper force indicator 48 is formed on the latch system 16. For example, the upper indicator panel 56 of the upper force indicator 48 may be formed on the latch 76. In another embodiment, the upper indicator panel 56 of the upper force indicator 48 is formed on the gate 14, such as on the second horizontal member 68. In another embodiment, the upper indicator panel 56 of the upper force indicator 48 is formed on the gate mount 12, such as on the first vertical frame 24.

The upper indicator panel 56 of the upper force indicator 48 is configured to display the third visual representation when the latch 76 is retracted from the latch receiver 28 formed in the gate mount 12 to indicate that the gate 14 is in the opened position and the latch 76 is in the unlocked configuration as shown in FIGS. 4 and 5. The upper indicator panel 56 is configured to display the fourth visual representation when the latch 76 extends into the latch receiver 28 formed in the gate mount 12 to indicate that the gate 14 is in the closed position and the latch 76 is in the locked configuration, as shown in FIGS. 7 and 8. Thus, the user can verify when the gate 14 is in the closed position and the latch 76 is in the locked configuration. The fourth visual representation is also displayed when the gate mount 12 is properly installed such that the upper indicator panel 56 provides multiple indications for users with the fourth visual indication.

The second visual representation of the lower indicator panel 50 is visible to the user via the slot 42 when the latch 76 is in the locked configuration and the gate 14 is in the closed position as shown in FIG. 1. The fourth visual representation of the upper indicator panel 56 is visible to the user when the latch 76 is in the locked configuration and the gate 14 is in the closed position as shown in FIG. 1. The upper force indicator 48 may further include a fifth visual representation 57 coupled to the gate 14 and blocked by the handle 72 in the locked configuration and exposed when the handle 72 is in the unlocked configuration.

The indicator panel 56 of the upper force indicator 48 may have a first indication zone 56A, a second indication zone 56B, and/or a third indication zone 56C as shown in FIG. 12. The first indication zone 56A has the third visual representation and is displayed when the force applied is less than a predetermined force to indicate more force is needed. The second indication zone 56B has the fourth visual representation and is displayed when the force applied is at or greater than the predetermined force to indicate installation of the upper bumper 58 is complete. The third indication zone 56C has the third visual representation, or another visual representation different than the third and fourth visual representations, and is displayed when the force applied is greater than a second predetermined force higher than the predetermined force. This can be used to indicate when the upper bumper 58 has been overtightened and at risk of damaging the gate unit 10.

Each of the bias members 53, 80 is designed to exert predetermined forces for use with the installation-indicator unit 44 to indicate when installation of the gate unit 10 in the frame 13 is complete. In the illustrative embodiment, each bias member 53, 80 has a spring constant which provides each respective predetermined force. In the illustrative embodiment, the predetermined force of both force indicator units 46, 48 is at least 80 lbf. In some embodiments, the predetermined force of both force indicator units 46, 48 is within a range of about 50 lbf to about 120 lbf. In some embodiments, the predetermined force of both force indicator units 46, 48 is within a range of about 60 lbf to about 100 lbf. In some embodiments, the predetermined force of both force indicator units 46, 48 is within a range of about 70 lbf to about 90 lbf.

In the illustrative embodiment, the bias member 53 of the lower force-indicator unit 46 has a first spring constant and the bias member 80 of the upper force indicator unit 48 has a second spring constant greater than the first spring constant. In this regard, the bias member 80 of the upper force indicator unit 48 may have a greater spring constant compared to the bias member 53 in the lower force indicator 46 so that the bias member 80 has less displacement (or compression) during installation compared to the bias member 53. Less displacement of the bias member 80 in the upper force indicator 48 may be desired when, as in the present disclosure, the indicator panel 56 is integrated into the latch pin 77.

The invention claimed is:

1. A gate unit comprising:

a gate mount adapted to mate with a frame bordering a passageway and formed to include a latch receiver, the gate mount including a first vertical frame, a second vertical frame in spaced apart relation to the first vertical frame, and a horizontal frame extending between and interconnecting lower ends of the first vertical frame and the second vertical frame, a gate mounted on the gate mount for pivotable movement about a gate-pivot axis between an opened position opening a passage formed in the gate mount and a closed position closing the passage formed in the gate mount, and a latch system coupled to the gate, the latch system including an actuator handle configured to pivot about a handle-pivot axis, a handle lock coupled to the actuator handle and configured to slide relative to the actuator handle, and a latch coupled to the actuator handle for movement relative to the gate between a locked configuration in which the latch extends into the latch receiver formed in the gate mount to lock the gate in the closed position so that the gate is blocked from movement about the gate-pivot axis and an unlocked configuration in which the latch is removed from the latch receiver formed in the gate mount to unlock the gate so that the gate is free for movement about the gate-pivot axis to the opened position, and an installation-indicator unit having a lower force indicator coupled to the horizontal frame beneath the gate and an upper force indicator coupled to an upper end of the gate, the installation-indicator unit configured to indicate that the gate mount is installed in the frame bordering the passageway, wherein the lower force indicator includes a lower indicator panel, a lower bumper, and a lower bumper insert configured to receive the lower bumper and engage the lower indicator panel, the lower indicator panel configured to display a first visual representation when a force less than a first predetermined force is applied through the lower bumper to the frame bordering the passageway and a second visual representation when the force applied through the lower bumper to the frame bordering the passageway is at least the first predetermined force, wherein the upper force indicator includes an upper indicator panel, an upper bumper, and an upper bumper insert configured to receive the upper bumper, the upper indicator panel configured to display a third visual representation when a force applied through the upper bumper to the frame bordering the passageway is less than a second predetermined force and a fourth visual representation when the force applied through the upper bumper to the frame bordering the passageway is at least the second predetermined force, wherein the horizontal frame is formed to include a lower bumper insert-receiving passageway formed to receive the lower bumper insert therein, and wherein the horizontal frame of the gate mount is formed to include a slot that opens into the lower bumper insert-receiving passageway, and the lower indicator panel is located within the lower bumper insert-receiving passageway and visible through the slot.

2. The gate unit of claim 1, wherein the lower indicator panel is configured to translate within the lower bumper insert-receiving passageway between a first position in which the first visual representation is displayed through the slot and a second position in which the second visual representation is displayed through the slot, and the lower bumper insert moves the lower indicator panel from the first position to the second position by pushing the lower indicator panel toward a centerline of the gate so that the lower indicator panel displays the second visual representation when the first predetermined force is reached.

3. The gate unit of claim 2, wherein the lower indicator panel is biased outwardly away from the centerline of the gate so that the first visual representation is displayed when the lower indicator panel is in the first position.

4. The gate unit of claim 1, wherein the lower bumper of the lower force indicator and the upper bumper of the upper force indicator directly contact the frame bordering the passageway, and the lower insert is configured to translate relative to the gate mount between an extended position, when the lower indicator panel displays the first visual representation, and a retracted position, when the lower indicator panel displays the second visual representation.

5. The gate unit of claim 1, wherein the upper indicator panel of the upper force indicator is configured to display the third visual representation when the latch is retracted from the latch receiver formed in the gate mount to indicate that the gate is in the opened position and the latch is in the unlocked configuration, and the latch includes a fifth visual representation blocked by the actuator handle when the latch is in the locked configuration and exposed when the latch is in the unlocked configuration.

6. The gate unit of claim 1, wherein the first vertical frame includes an upper end and a lower end spaced apart from the upper end and coupled to the horizontal frame, wherein the upper end is spaced a first distance from the gate when the force applied to the upper bumper is less than the second predetermined force and a second distance less than the first distance when the force applied the upper bumper is at least the second predetermined force.

7. The gate unit of claim 1, wherein the lower force indicator further includes a bias member configured to urge the lower indicator panel, the lower bumper, and the lower bumper insert away from a centerline of the gate, and the first predetermined force is provided by the bias member.

8. A gate unit comprising:

a gate mount adapted to mate with a frame bordering a passageway, a gate mounted on the gate mount for movement between an opened position opening a passage formed in the gate mount and a closed position closing the passage formed in the gate mount, and a lower force indicator, the lower force indicator including a lower indicator panel, a lower bumper, and a lower bumper insert configured to receive the lower bumper and engage the lower indicator panel, the lower indicator panel configured to display a first visual representation when a force less than a first predetermined force is applied through the lower bumper to the frame bordering the passageway and a second visual representation when a force that is at least the first predetermined force is applied through the lower bumper to the frame bordering the passageway, wherein the gate mount includes a first vertical frame, a second vertical frame in spaced apart relation to the first vertical frame, and a horizontal frame extending between and interconnecting lower ends of the first vertical frame and the second vertical frame, the horizontal frame arranged parallel with an underlying floor and formed to include a lower bumper insert-receiving passageway formed to receive the lower bumper insert therein.

9. The gate unit of claim 8, wherein the horizontal frame of the gate mount is formed to include a slot that opens into the lower bumper insert-receiving passageway, and the lower indicator panel is located within the lower bumper insert-receiving passageway and visible through the slot to display the first visual representation through the slot when the force applied to the lower bumper is less than the first predetermined force and to display the second visual representation through the slot when the force applied to the lower bumper is at or greater than the first predetermined force.

10. The gate unit of claim 9, wherein the lower indicator panel is configured to translate within the lower bumper insert-receiving passageway between a first position in which the first visual representation is displayed through the slot and a second position in which the second visual representation is displayed through the slot, and the lower bumper insert moves the lower indicator panel from the first position to the second position by pushing the lower indicator panel toward a centerline of the gate so that the lower indicator panel displays the second visual representation when the first predetermined force is reached.

11. The gate unit of claim 8, wherein the lower bumper of the lower force indicator directly contacts the frame bordering the passageway, and the lower bumper insert is configured to translate relative to the gate mount between an extended position, when the lower indicator panel displays the first visual representation, and a retracted position, when the lower indicator panel displays the second visual representation.

12. The gate unit of claim 8, wherein the lower force indicator further includes a bias member configured to urge the lower indicator panel, the lower bumper, and the lower bumper insert away from a centerline of the gate so that the first predetermined force is provided only by the bias member and the bias member suspends the gate mount between the lower bumper and a second lower bumper positioned on an opposite side of the gate mount.

13. The gate unit of claim 8, wherein the first visual representation of the lower indicator panel is a first color or symbol, the second visual representation of the lower indicator panel is a second color or symbol different than the first color or symbol, and the lower indicator panel is configured to display a third visual representation when the force applied to the lower bumper is greater than a second predetermined force, the second predetermined force being greater than the first predetermined force.

14. A gate unit comprising:

a gate mount adapted to mate with a frame bordering a passageway and formed to include a latch receiver, a gate mounted on the gate mount for movement between an opened position opening a passage formed in the gate mount and a closed position closing the passage formed in the gate mount, and a latch system including an actuator handle configured to pivot about a handle-pivot axis, a handle lock coupled to the actuator handle and configured to slide relative to the actuator handle, and a latch coupled to the actuator handle for movement relative to the gate between a locked configuration in which the latch engages with a latch receiver formed in the gate mount to lock the gate in the closed position so that the gate is blocked from movement about a gate-pivot axis and an unlocked configuration in which the latch is removed from the latch receiver formed in the gate mount to unlock the gate so that the gate is free for movement about the gate-pivot axis to the opened position, wherein the latch includes a latch pin configured to engage with the latch receiver in the locked configuration to block the gate from opening and a latch-pin mover coupled with the latch pin, the actuator handle, and the gate, the latch-pin mover including a plurality of linkages coupled with the latch pin, the actuator handle, and the gate and configured to move the latch pin from the locked configuration to the unlocked configuration in response to pivoting the actuator handle about the handle pivot axis, and a pin-bias member configured to urge the latch pin toward the latch receiver, and wherein the plurality of linkages includes a first linkage having a first end coupled to the latch pin, a second linkage having a first end coupled to a second end of the first linkage and a second end coupled to the actuator handle, and a third linkage having a first end coupled to the first end of the second linkage and a second end coupled to the gate, and wherein the second linkage is configured to move with the actuator handle about the handle pivot axis to decrease a distance between the first end of the first linkage and the second end of the third linkage, and the first linkage is configured to withdraw the latch pin from the latch receiver formed in the gate mount in the unlocked configuration.

15. The gate unit of claim 14, wherein the latch pin includes a pin base configured to engage with the latch receiver and a guide post coupled to the pin base and to the first end of the first linkage, and the pin-bias member includes a spring wrapped around the guide post and configured to apply a force between the first end of the first linkage and the pin base to urge the latch pin toward the latch receiver, and wherein the gate unit further comprises a force indicator having an indicator panel coupled to the latch pin and having a first indication zone and a second indication zone, an upper bumper configured to engage with the frame bordering the passageway, and an upper bumper insert coupled between the upper bumper and the gate mount, and wherein the upper bumper is configured to apply a force on the gate mount to cause the latch pin to translate relative to the gate so that the indicator panel displays the first indication zone and the second indication zone when the force is less than a predetermined force and only the second indication zone when the force is at or greater than the predetermined force.

16. The gate unit of claim 15, wherein the guide post is formed to include a slot that receives a portion of the first end of the first linkage, and the latch pin is configured to translate relative to the gate and the plurality of linkages between an extended position, in which the pin base is separated from the latch receiver and is spaced a first distance from the first end of the first linkage prior to installation of the gate unit in the frame, and a retracted position, in which the pin base engages the latch receiver and is spaced a second distance from the first end of the first linkage, less than the first distance, after installation of the gate unit in the frame, the spring having a first length when the latch pin is in the extended position and a second length when the latch pin is in the retracted position less than the first length.

* * * * *